June 19, 1956  C. D. VISOS  2,750,876
BREAD LIFT FOR TOASTERS
Filed Aug. 11, 1951
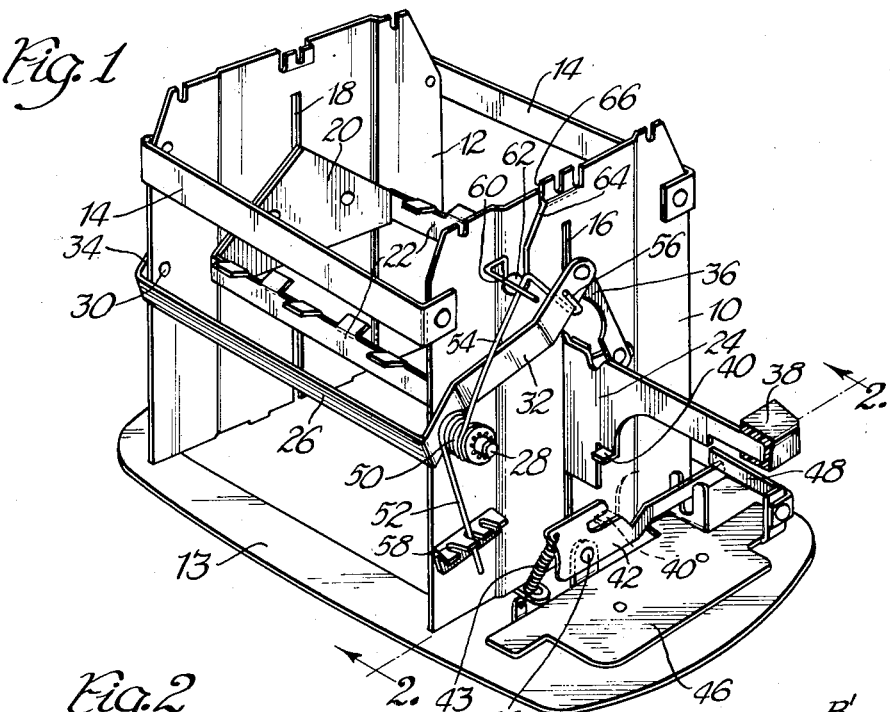
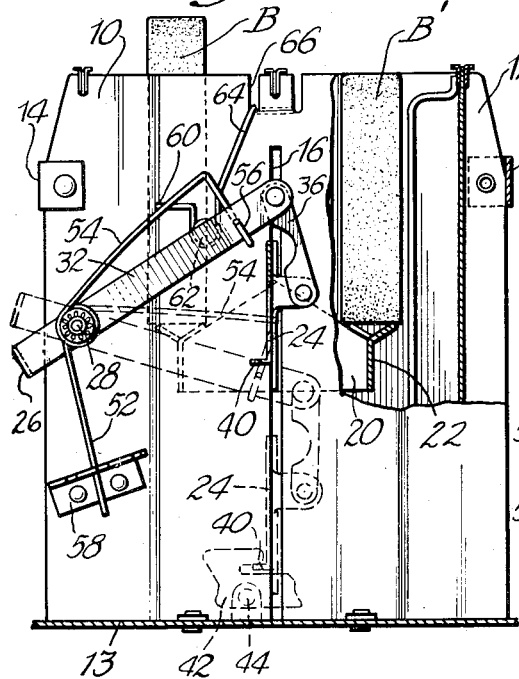
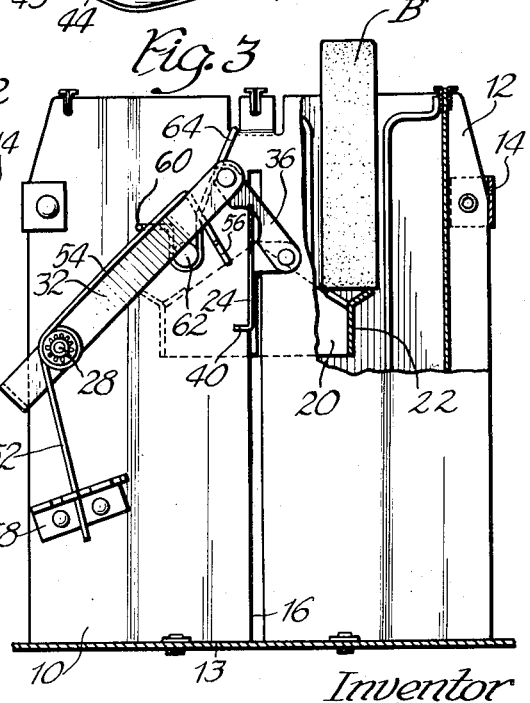
Inventor
Charles D. Visos
by Bair, Freeman & Molinare
Attys.

United States Patent Office 2,750,876
Patented June 19, 1956

2,750,876

BREAD LIFT FOR TOASTERS

Charles D. Visos, St. Louis, Mo., assignor to Knapp-Monarch Company, St. Louis, Mo., a corporation of Delaware Application August 11, 1951, Serial No. 241,423

2 Claims. (Cl. 99—391)

This invention relates to a bread lift for toasters and particularly one which is adaptable for lifting the bread carrier after it has been released by a thermal timer or the like and raised to a normal non-toasting position, so that if the slice of bread is smaller than normal and thereby still remains within the toaster where it is not readily accessible, it can be lifted to a higher position so that it can be grasped by the operator and removed from the toaster.

One object of the invention is to provide a bread carrier so arranged that it can be manually raised an additional amount after being automatically raised to its normal position, thus enabling easy removal of small slices of bread without the use of a fork or other implement of any kind and without burning the fingers.

Another object is to provide in a pop-up toaster from which regular size bread slices may be readily removed, a means to manually impart additional elevation to the bread carrier for easy removal also of small slices of bread from the toaster.

A further object is to provide an assembly of elements including a spring arm having a hook normally engaging a lever for elevating the bread carrier to a predetermined position, and the bread carrier being capable of manual elevation above the predetermined position with the lever moving away from the hook of the spring arm.

Still a further object is to provide a resilient stop for the bread carrier in its automatically raised position.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 1 is a perspective view of portions of a toaster frame and bread carrier with my invention applied thereto.

Figure 2 is an end elevation of Figure 1, partly in section on the line 2—2 of Figure 1; and Figure 3 is a similar end elevation showing the additional movement imparted to the bread carrier for elevating a small slice of bread to a position of ready access.

On the accompanying drawing I have used the reference numerals 10 and 12 to indicate end plates of a toaster frame which may be connected by straps 14 and other suitable means such as a base plate 13. The end plates 10 and 12 are provided with slots 16 and 18 through which suitable sheet metal stampings forming part of a bread carrier 20—22 are slidably mounted. One of these stampings is shown at 24, and the bread carrier comprises a pair of end plates 20 and the bread supporting bars 22.

An equalizing bar 26 is pivoted at 28 and 30 to the end plates 10 and 12 and its arms 32 and 34 are connected by links 36 to the stamping 24 and a similar stamping outside the plate 12 (not shown). The stamping 24 is provided with a manually engageable knob 38 for depressing or raising the bread carrier 20—22.

The stamping 24 is provided with a hook 40 with which a latch lever 42 is engageable when the hook 40 is lowered to the dotted position shown in Figure 1 whereupon the lever 42 will be moved by the hook 40 to the position illustrated. This lever is pivoted at 44 to a control base plate 46 and in the lowered position shown is restrained against its normal movement counter-clockwise about the pivot 44 by a latch 48. The control base plate 46 is for a thermal control mechanism which forms no part of my present invention and which therefore has not been illustrated. This mechanism, at the end of a suitable period of time for properly toasting the bread, releases the latch 48 automatically from the latch lever 42.

A coil spring 50 having arms 52 and 54 is provided on the pivot 28. The arm 54 is provided with a hook 56 for the arm 32. The spring arm 52 is adjustably engaged in the notches of a bracket 58 for properly tensioning the coil 50 for raising the lever 32 and thereby the bread carrier 20—22 to the position shown in Figures 1 and 2. A resilient stop 60 is provided for the spring arm 54 in the position just mentioned and this may be formed up of a spring wire mounted on a rivet 62 and having a hooked end 64 engaged in a notch 66 of the frame plate 10.

Practical operation

In the operation of my bread lift for toasters, the bread carrier is first depressed from the position of Figure 1 to the dotted position of Figure 2 by manually depressing the knob 38 whereupon the hook 40 of Figure 1 will assume the dotted position illustrated and in so doing will swing the latch lever 42 downwardly against the action of a spring 43. Thereupon the latch 48 retains the latch lever 42 against counter-clockwise swinging until the thermally timed period has expired and automatically releases the latch 48 from the latch lever 42. The spring 50 is then free to elevate the bread carrier and the slices of bread B and B' carried thereby to the position shown in Figure 2, with the spring arm 54 engaging the resilient stop 60 after which momentum may carry the bread carrier up a slight distance, with the lever 32 leaving the hook 56 and then returning to rest therein.

The slice of bread B illustrates a regular size slice while the slice B' is a relatively small slice and it will be noted that it does not project high enough out of the toaster in Figure 2 to be readily grasped by the fingers of the operator.

Accordingly, when it is desirable to remove the slice B', the knob 38 may be engaged and elevated as to the position shown in Figure 3, the lever 32 thus being lifted out of the hook 56 of the spring arm 54. If the knob is raised as far as it will go, the lever 32 will strike the spring arm 54 and thus be stopped against further manual elevation by the resilient stop 60. Thus while the automatic operation of the toaster elevates the bread carrier to one position suitable for regular size slices of toast, the arrangement is capable of further elevation manually to permit ready access to a small slice of bread.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a bread lift adapted to be positioned within a toaster casing, a frame having a vertically movable bread carrier mounted thereon, a coil spring rotatably mounted on said frame, one terminal end of said spring being fixedly secured to said frame and the other terminal end of said spring being laterally extended to provide a support arm, the free end of said support arm forming an upwardly open hook upon which an integral portion of said carrier is positioned, said hook serving to confine said carrier portion in lateral and downward directions while permitting free removal upwardly therefrom, said spring being biased so as to raise said support arm and thereby said carrier to a predetermined elevated position relative to said frame, said bread carrier being adapted for additional manual elevation above said predetermined elevated position, said portion of said carrier positioned upon said hook being lifted upwardly out of engagement therewith when said carrier is manually elevated above said predetermined elevated position, and a resilient stop member carried by said frame and positioned so as to engage said support arm and limit its biasing movement at said predetermined elevated position.

2. In a bread lift adapted to be positioned within a toaster casing, a frame having a vertically movable bread carrier mounted thereon, a coil spring rotatably mounted on said frame, one terminal end of said spring being fixedly secured to said frame and the other terminal end of said spring being laterally extended to provide a support arm, the free end of said support arm forming an upwardly open hook upon which an integral portion of said carrier is positioned, said hook serving to confine said carrier portion in lateral and downward directions while permitting free removal upwardly therefrom, said spring being biased so as to raise said support arm and thereby said carrier to a predetermined elevated position relative to said frame, releasable latch means carried by said frame and cooperating with said carrier when in a lowered position relative to said frame to retain said carrier against the bias of said spring, said bread carrier being adapted for additional manual elevation above said predetermined elevated position, said portion of said carrier positioned upon said hook being lifted upwardly out of engagement therewith when said carrier is manually elevated above said predetermined elevated position, and a resilient stop member carried by said frame and positioned so as to engage said support arm and limit its biasing movement at said predetermined elevated position.

References Cited in the file of this patent
UNITED STATES PATENTS

| | | |
|---|---|---|
| 1,931,345 | Fitzgerald | Oct. 17, 1933 |
| 2,070,333 | Freeman | Feb. 29, 1937 |
| 2,155,852 | Anderson et al. | Apr. 25, 1939 |
| 2,171,897 | Sardeson | Sept. 5, 1939 |
| 2,343,347 | Turner | Mar. 7, 1944 |
| 2,361,446 | Anderson | Oct. 31, 1944 |
| 2,416,014 | McCullough | Feb. 18, 1947 |
| 2,591,886 | Snyder | Apr. 8, 1952 |